UNITED STATES PATENT OFFICE.

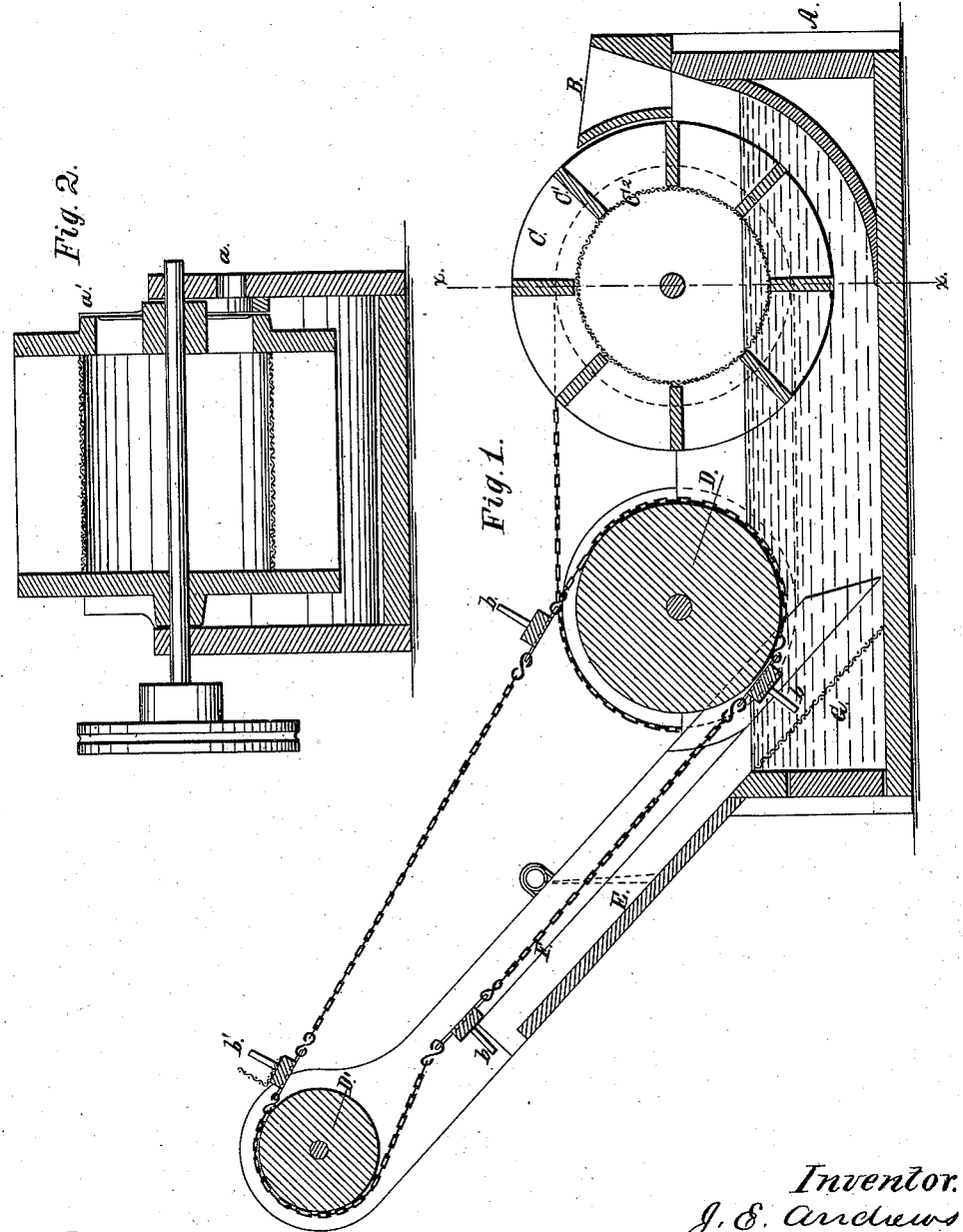

J. E. ANDREWS, OF COEYMANS HOLLOW, NEW YORK.

MACHINE FOR WASHING PAPER-STOCK.

Specification forming part of Letters Patent No. 79,935, dated July 14, 1868.

*To all whom it may concern:*

Be it known that I, J. E. ANDREWS, of Coeymans Hollow, in the county of Albany and State of New York, have invented a new and useful Improvement in Machines for Washing Paper-Stock; and I do hereby declare that the following is a full, clear, and exact description thereof, which will enable others skilled in the art to make and use the same, reference being had to the accompanying drawings, forming part of this specification, in which—

Figure 1 represents a longitudinal sectional elevation of my improved machine. Fig. 2 represents a section on the line $x\,x$ of Fig. 1.

Similar letters of reference indicate like parts.

The nature of my invention relates to improvements in machines for washing paper-stock—such as straw, rags, wood fiber, and other similar material—whether in the condition of pulp or before it is reduced to pulp, whereby it is designed to accomplish the same in a cheaper and more expeditious manner than has hitherto been done.

It consists in a water-tank provided with an agitating-wheel, and a hopper adjacent to the same, into which the stock to be washed is placed, and so exposed to the action of the floats on the wheel that it will be drawn down into the water thereby, when it is, after being sufficiently agitated in the water, delivered to an elevating apparatus, whereby it is raised out of the water and carried to any desired height and delivered from the same. The said tank is also provided with a means of supplying fresh water and discharging the foul water without carrying off any of the stock, and also with a screen for separating the kernels of grain that may be in the straw, or small pieces of gravel or other similar matter, as will be more fully described on reference to the accompanying drawings.

A represents a water-tank, provided with a hopper, B, through which the rags are fed into the said tank.

C represents a wheel, provided with floats C' and with wire-screen coverings.

$a$ represents an opening through the side of the tank for the foul water to pass off. A hub, $a'$, is provided on the end of the wheel C, adjacent to the opening $a$, which, together with a corresponding curved projection on the side of the tank, form a close joint, whereby the passage of the water around the end of the wheel to the outlet-passage is prevented; hence no water can escape, except it pass through the wire screen $C^2$ to the interior of the wheel, whereby the passage of the stock in that direction with the water is prevented.

D and D' represent revolving cylinders, around which endless chains are passed, to which are attached rakes $b\,b$ and $b'$, for delivering the pulp from the tank.

E represents an inclined chute or spout, in the upper end of which the roller D' is arranged, and which may be carried to any desired height to discharge the stock in the upper stories of the building.

F represents guides or ways arranged on each side of the chute E, and elevated above the bottom of it about the distance of the length of the teeth of the rakes, on which the ends of the rakes ride as they are drawn upward by the endless chains. To cause the wet stock to be readily discharged from the rakes, the said ways or guides E are so arranged that as the rakes rise up toward the upper ends of the ways they are forced inward from the straight line, which they would otherwise pursue, toward a line between the axis of the two rollers D and D' to such an extent that as they pass beyond the ends of the said ways the additional tension of the chains produced by the said deviation from the straight line will cause the rakes to fly outward, in the efforts of the chains to assume a straight line, with such force as to discharge the stock readily from the rakes. The rake $b'$ is provided with a comb of screen-wire, which may be used when pulp is being washed the fiber of which is too fine to be held by the rakes $b$.

G represents a screen placed at the foot of the incline, which is designed to separate any kernels of grain that may remain in the straw, or small gravel or other such foul matter.

Power may be applied to the shaft of the wheel C in any suitable manner, and be communicated from that to the cylinder D by a belt or by gearing, as may be most desirable.

Having thus described my invention, I claim as new and desire to secure by Letters Patent—

1. The combination, with the tank A, of the wheel C, provided with the floats C', screen $C^2$, and hubs $a'$, substantially as and for the purpose described.

2. The combination, with the tank A, of the chute E, cylinders D and D', and endless chains provided with the rakes, substantially as and for the purpose described.

3. The combination, with the endless chains provided with rakes, of the guides or ways F, substantially as and for the purpose described.

4. The combination, with the water-tank A, chute E, and rakes $b$, of the screen G, substantially as and for the purpose described.

J. E. ANDREWS

Witnesses:
W. S. BRIGGS,
J. H. MOORE.